(12) United States Patent
Singh et al.

(10) Patent No.: US 11,107,167 B2
(45) Date of Patent: Aug. 31, 2021

(54) IRRIGATION PLANNING SYSTEM

(71) Applicant: International Business Machines Corporation, Armonk, NY (US)

(72) Inventors: Jitendra Singh, Noida (IN); Saurav Basu, New Delhi (IN); Mukul Tewari, Boulder, CO (US); Lloyd A Treinish, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 16/561,071

(22) Filed: Sep. 5, 2019

(65) Prior Publication Data
US 2021/0073925 A1 Mar. 11, 2021

(51) Int. Cl.
*G06Q 50/02* (2012.01)
*G06Q 10/06* (2012.01)

(52) U.S. Cl.
CPC ....... *G06Q 50/02* (2013.01); *G06Q 10/06313* (2013.01)

(58) Field of Classification Search
CPC .......... G06Q 50/02; G06Q 10/06313
See application file for complete search history.

(56) References Cited

U.S. PATENT DOCUMENTS

| | | | |
|---|---|---|---|
| 5,870,302 A | 2/1999 | Oliver | |
| 6,298,285 B1 | 10/2001 | Addink et al. | |
| 6,892,113 B1 | 5/2005 | Addink et al. | |
| 6,947,811 B2 | 9/2005 | Addink et al. | |
| 7,532,954 B2 | 5/2009 | Evelyn-Veere | |
| 9,301,461 B2 | 4/2016 | Woytowitz et al. | |
| 10,139,797 B2 | 11/2018 | Mewes et al. | |
| 2002/0014539 A1* | 2/2002 | Pagano | A01G 25/167 239/1 |
| 2006/0157580 A1 | 7/2006 | Regli | |

(Continued)

OTHER PUBLICATIONS

Vahmani et al., "Incorporating an Urban Irrigation Module into the Noah Land Surface Model Coupled with an Urban Canopy Model," Journal of Hydrometeorology, vol. 15, No. 4, Feb. 2014, 17 pages, DOI: 10.1175/JHM-D-13-0121.1.

(Continued)

*Primary Examiner* — Thomas C Lee
*Assistant Examiner* — Anzuman Sharmin
(74) *Attorney, Agent, or Firm* — Jamar K. Ray

(57) ABSTRACT

A computer-implemented method can include obtaining irrigation data. The method can further include obtaining a first set of watering rates. The method can further include generating a first set and a second set of soil moisture estimates. The first and second sets of soil moisture estimates can be based at least in part on the irrigation data. The method can further include obtaining a custom constraint and making a first determination that the first set of soil moisture estimates satisfies the custom constraint. The method can further include obtaining a moisture reference value in response to making the first determination. The moisture reference value can be based at least in part on the second set of soil moisture estimates. The method can further include making a second determination that the moisture reference value exceeds a first threshold, and generating an irrigation plan in response to making the second determination.

14 Claims, 6 Drawing Sheets

(56) References Cited

U.S. PATENT DOCUMENTS

| | | | |
|---|---|---|---|
| 2010/0010682 A1 | 1/2010 | Cardinal et al. | |
| 2012/0290140 A1 | 11/2012 | Groeneveld | |
| 2014/0236868 A1* | 8/2014 | Cook | G06Q 50/02 705/412 |
| 2015/0313098 A1 | 11/2015 | Halahan et al. | |
| 2016/0135389 A1 | 5/2016 | Ersavas et al. | |
| 2016/0217231 A1* | 7/2016 | Mewes | G06F 30/20 |
| 2017/0038749 A1 | 2/2017 | Mewes et al. | |
| 2017/0082568 A1* | 3/2017 | Pillai | G01N 27/223 |
| 2017/0112079 A1 | 4/2017 | Eyring et al. | |
| 2019/0147094 A1* | 5/2019 | Zhan | A01G 22/00 707/718 |

OTHER PUBLICATIONS

Unknown, "Agriculture at a Crossroads," global agriculture, Printed Jul. 1, 2019, 2 pages.

Xia et al., "Calibrating a Land Surface Model of Varying Complexity Using Multicriteria Methods and the Cabauw Dataset," Journal of Hydrometeorology, vol. 3, Apr. 2002, Copyright 2002 American Meteorological Society, 14 pages, https://doi.org/10.1175/1525-7541(2002)003<0181:CALSMO>2.0.CO;2.

Unknown, "Irrigation Scheduling Using Real Time Soil Moisture Measurements," US Department of the Interior, Bureau of Reclamation, Dec. 2003, 81 pages.

Bellingham, "Method for Irrigation Scheduling Based on Soil Moisture Data Acquisition," Stevens Water Monitoring Systems, Inc., Portland OR, Printed Jul. 1, 2019, 18 pages.

Shock et al., "Soil Moisture Based Irrigation Scheduling to Improve Crops and the Environment," Malheur Experiment Station and Malheur County Extension Oregon State University, 2002, 8 pages.

Aguilar et al., "Irrigation Scheduling Based on Soil Moisture Sensors and Evapotranspiration," Kansas Agricultural Experiment Station Research Reports, vol. 1, Issue 5 Southwest Research-Extension Center Reports, Article 20, Jan. 2015, 8 pages, https://doi.org/10.4148/2378-5977.1087.

Unknown, "Crop Water Allocator," Mobile Irrigation Allocator, Kansas State University Research and Extension, Printed Jul. 1, 2019, 1 page.

Zazueta et al., "Irrigation System Controllers Introduction," Alliance for Water Efficiency, Promoting the Efficient and Sustainable Use of Water, Copyright © 2008, 2019 Alliance for Water Efficiency, 12 pages http://www.allianceforwaterefficiency.org/Irrigation_Controller_Introduction.aspx.

Unknown, "Irrigation Scheduling Tools," Cotton Incorporated, Printed Jul. 1, 2019, 5 pages https://www.cottoninc.com/cotton-production/ag-resources/irrigation-management/irrigation-scheduling-tools/.

Unknown, "Five Keys to Creating an Optimum Irrigation Schedule," Rain Bird, Printed Jul. 1, 2019, 3 pages https://www.rainbird.com/sites/default/files/media/documents/2018-02/bro_5keys.pdf.

Mell et al., "The NIST Definition of Cloud Computing", Recommendations of the National Institute of Standards and Technology, Sep. 2011, 7 pages.

\* cited by examiner

IRRIGATION PLANNING SYSTEM

BACKGROUND

The present disclosure relates to irrigation, and more specifically, to developing an irrigation plan.

Irrigation can include providing water to a variety of types of vegetation. Irrigation planning can include determining quantities of water to provide and intervals at which the water is provided.

SUMMARY

According to embodiments of the present disclosure, a computer-implemented method can include obtaining, by an irrigation planning system, irrigation data. The method can further include obtaining, by the irrigation planning system, a first set of watering rates. The method can further include generating, by the irrigation planning system, a first set of soil moisture estimates and a second set of soil moisture estimates. The first set of soil moisture estimates and the second set of soil moisture estimates can be based at least in part on the irrigation data. The method can further include obtaining, by the irrigation planning system, a custom constraint. The method can further include making a first determination, by the irrigation planning system, that the first set of soil moisture estimates satisfies the custom constraint. The method can further include obtaining, by the irrigation planning system, a moisture reference value in response to making the first determination. The moisture reference value can be based at least in part on the second set of soil moisture estimates. The method can further include making a second determination, by the irrigation planning system, that the moisture reference value exceeds a first threshold. The method can further include generating, by the irrigation planning system, an irrigation plan in response to making the second determination.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
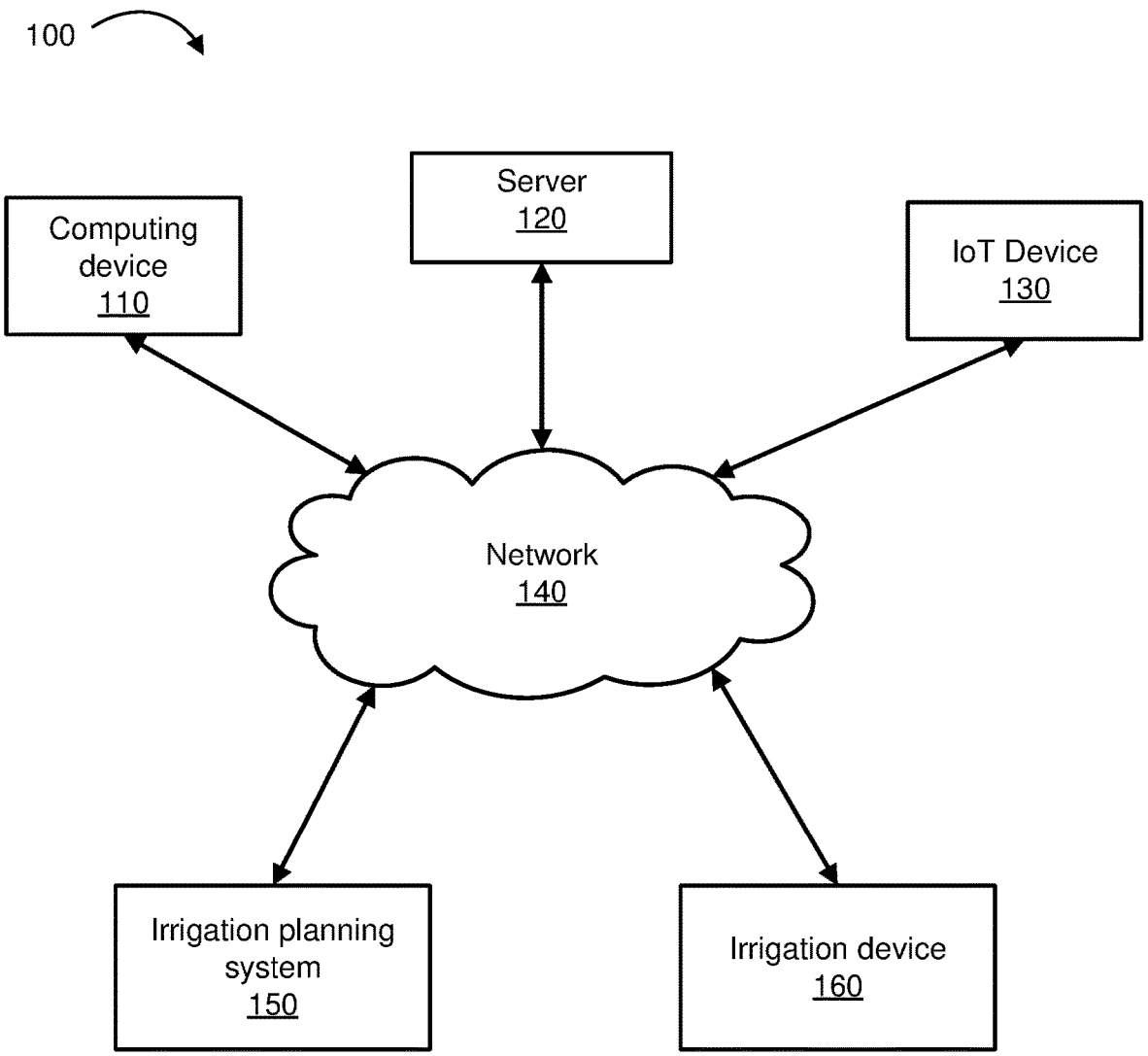
FIG. 1 depicts an example computing environment having an irrigation planning system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to irrigation planning; more particular aspects relate to tailored, efficient irrigation planning. While the present disclosure is not necessarily limited to such applications, various aspects of the disclosure can be appreciated through a discussion of various examples using this context.

High irrigation costs and limited access to freshwater resources can provide strong incentives to irrigating efficiently. Additionally, inefficient irrigation can cause a variety of water-related losses, such as unnecessary water percolation beyond a root zone depth layer (e.g., a region below a surface where a plant can absorb water from soil); leaching of pesticides, fertilizers, and herbicides; and wasted energy expended on irrigation. (In this disclosure, a "surface" can refer to a surface of land or of a soil composition in which vegetation is planted.) Irrigation plans can specify quantities of water to distribute to vegetation as well as time intervals for such distributions; however, such plans may not be designed to minimize water-related losses. Additionally, the effectiveness of methods used to generate irrigation plans can be limited by data inputs and/or approximations that do not accurately represent relevant environmental conditions.

To address these and other problems, embodiments of the present disclosure include an irrigation planning system that generates irrigation plans that can minimize water-related losses. In some embodiments, an irrigation plan can include one or more of a set of watering rates, an irrigation time period, one or more irrigation time increments, an irrigation date, and an irrigation time of day. In some embodiments, the irrigation planning system can utilize simulation-based optimization to generate an irrigation plan. In some embodiments, the irrigation planning system can account for interactions between a surface, vegetation, and the atmosphere when generating an irrigation plan. For example, in some embodiments, the irrigation planning system can include a soil moisture simulator that can generate a soil moisture estimate based at least in part on inputs such as precipitation rate, ambient temperature, relative humidity, and solar radiation. In some embodiments, the irrigation planning system can include a plan optimizer that can generate an irrigation plan based, at least in part, on a soil moisture estimate from a soil moisture simulator and a set of custom constraints. (In this disclosure, a "set" can include one or more items; thus, a "set" of custom constraints can include one or more custom constraints). In some embodiments, the set of custom constraints can include one or more user-specific limitations. For example, in some embodiments, a user of an irrigation planning system may need to irrigate crops on a Tuesday morning because irrigation equipment will be disabled for servicing on Tuesday afternoon. Additionally in this example, a Tuesday weather forecast can include precipitation. In this example, the user can input into the irrigation planning system a custom constraint for Tuesday morning irrigation. Further in this example, the irrigation planning system can generate an irrigation plan that minimizes water-related losses, while accounting for the custom constraint for Tuesday morning irrigation. Further in this example, the irrigation planning system can obtain the weather forecast and account for the anticipated precipitation when it generates the irrigation plan.

In some embodiments, the irrigation planning system can implement an iterative process between the soil moisture simulator and the plan optimizer to generate an irrigation plan that can reduce water percolation in a predetermined region below a surface. For example, in some embodiments, such an iterative process can include the irrigation planning system obtaining an initial set of watering rates (e.g., a set of a flow rate values for delivering irrigation water to vegetation). In this example, the initial set of watering rates can include a set of stored watering rates from a previous irrigation plan and can account for forecasted rainfall during the planned irrigation time. Further in this example, the irrigation planning system can use the initial set of watering rates to perform an iterative cycle of calculations until the irrigation planning system determines that a threshold has been exceeded. Further in this example, the irrigation planning system can generate an irrigation plan that includes a final set of watering rates.

For example, the soil moisture simulator of the irrigation planning system can obtain irrigation data that includes an initial set of watering rates, elevation information, vegetation data, and meteorological parameters. Continuing with this example, the soil moisture simulator can use the obtained irrigation data to generate a set of soil moisture estimates at a depth layer (e.g., a region below a surface, such as a region extending from 0.15 m below the surface to 0.75 m below the surface). Further in this example, the soil moisture simulator can transmit the set of soil moisture estimates to a plan optimizer. Further in this example, the plan optimizer can generate a set of adjusted watering rates that is based on the set of soil moisture estimates and a set of obtained custom constraints (e.g., a minimum required soil moisture for a type of vegetation, a specific quantity of water available for irrigation, a specific amount of power available for pumping irrigation water, etc.). Further in this example, the plan optimizer can transmit the set of adjusted watering rates to the soil moisture simulator, and the soil moisture simulator can generate an updated set of soil moisture estimates based on the set of adjusted watering rates and obtained irrigation data. In this example, the irrigation planning system can continue an iterative process in which the soil moisture simulator transmits updated sets of soil moisture estimates to the plan optimizer and the plan optimizer transmits sets of adjusted watering rates to the soil moisture simulator until the irrigation planning system determines that one or more thresholds have been exceeded.

For example, in some embodiments, the irrigation planning system can utilize a defined root zone depth layer (e.g., a region below a surface where a set of crops can absorb water from soil). In this example, the root zone depth layer can be defined as a region extending from 0.15 m below the surface to 0.75 m below the surface. Further in this example, the irrigation planning system can utilize a definition of a surplus zone depth layer (e.g., a region below the root zone depth layer where the presence of moisture from percolated irrigation water indicates wasted irrigation water). In this example, the surplus zone depth layer can be defined as a region extending from 0.75 m below the surface to 1.5 m below the surface. Further in this example, the irrigation planning system can define a threshold to be a function that can indicate when a set of watering rates corresponds to a minimum rate of percolated water into the surplus zone depth layer. Further in this example, the irrigation planning system can continue the iterative process discussed above until the soil moisture simulator generates a set of soil moisture estimates that exceeds the threshold. Further in this example, when the irrigation planning system determines that the threshold has been exceeded, the plan optimizer can generate a final set of watering rates. Further in this example, the irrigation planning system can include the final set of watering rates in an irrigation plan.

Turning to the figures, FIG. 1 illustrates an example computing environment 100 that includes a computing device 110, a server 120, an IoT device 130, an irrigation device 160, and an irrigation planning system 150, that can exchange data through a network 140. In some embodiments, the computing environment 100 can include a plurality of at least one of the computing device 110, the server 120, the IoT device 130, the irrigation device 160, the irrigation planning system 150, and the network 140. In some embodiments, one or more of the computing device 110, the server 120, the IoT device 130, the irrigation device 160, the irrigation planning system 150, and the network 140, can include a computer system, such as the computer system 401 described with respect to FIG. 4.

Referring back to FIG. 1, in some embodiments, the irrigation planning system 150 can be a discrete computer system. In some embodiments, the irrigation planning system 150 can be a computer program or application implemented on a processor of a computer system. For example, in some embodiments, the irrigation planning system 150 can be a computer program installed on the computing device 110. In some embodiments, the computing device 110 can include a device such as a desktop computer, a tablet, a laptop computer, or a smart phone. In some embodiments, the computing device 110 and/or the server 120 can obtain, store, and/or process data for the irrigation planning system 150. For example, in some embodiments, one or more of the computing device 110 and the server 120 can obtain, store, and/or process custom constraints and/or irrigation data, such as custom constraints 360 and irrigation data 370 discussed with respect to FIG. 3. In some embodiments, IoT device 130 can include one or more sensors, such as precipitation sensors, temperature sensors, and barometers. In some embodiments, IoT device 130 can include one or more devices configured to acquire irrigation data, such as irrigation data 370 discussed with respect to FIG. 3. In some embodiments, irrigation device 160 can include one or more irrigation devices, such as a set of sprinkler devices configured to distribute water according to an irrigation plan generated by the irrigation planning system 150. In some embodiments, the network 140 can be a wide area network (WAN), a local area network (LAN), the Internet, or an intranet. In some embodiments, the network 140 can be substantially similar to, or the same as, cloud computing environment 50 described in FIG. 5.

Figure 2:
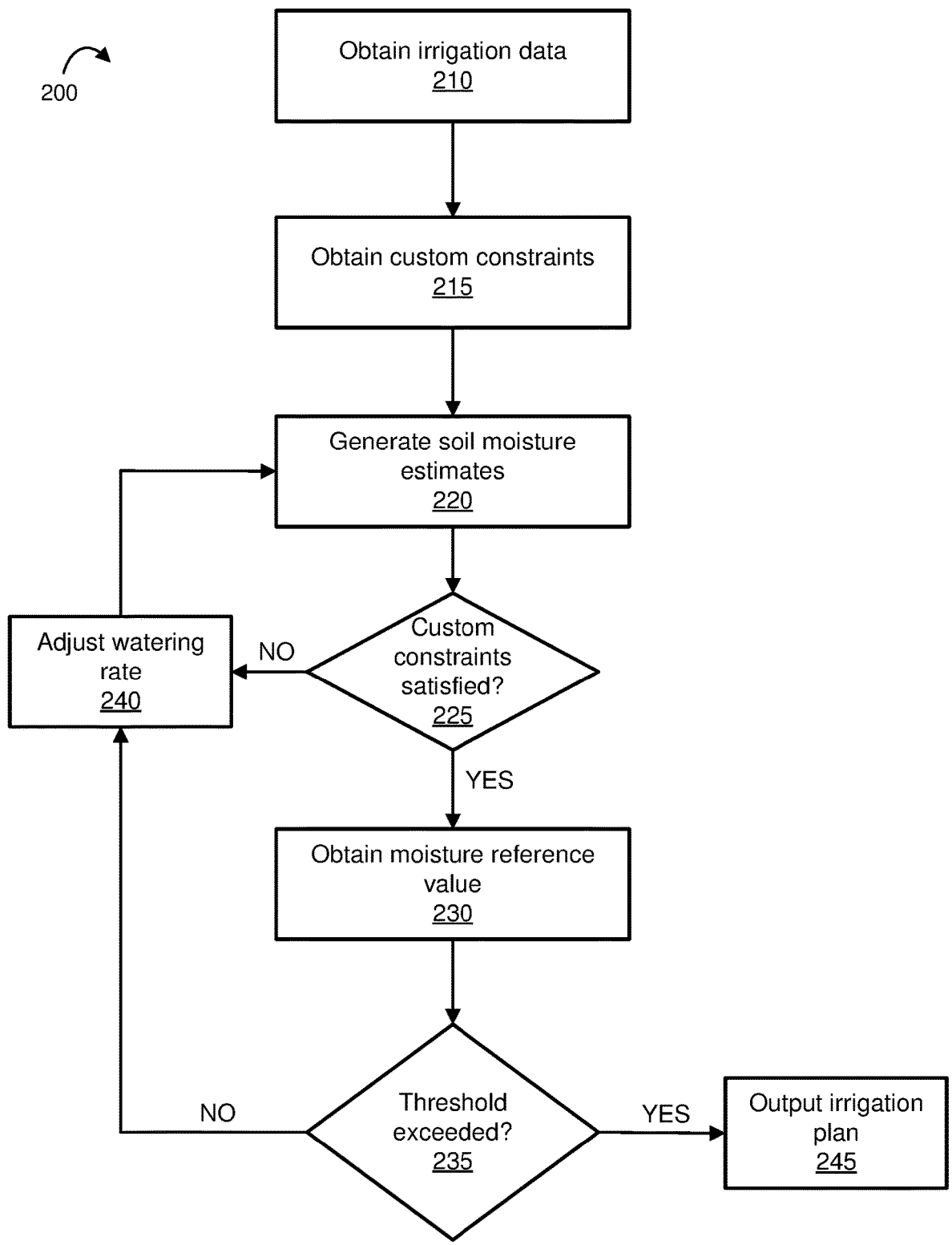
FIG. 2 depicts a flowchart of an example method for generating an irrigation plan, in accordance with embodiments of the present disclosure.

FIG. 2 illustrates a flowchart of an example method 200 for generating an irrigation plan, in accordance with embodiments of the present disclosure. The method 200 can be performed by an irrigation planning system, such as the irrigation planning system 150 described with respect to FIG. 1 or the irrigation planning system 335 described with respect to FIG. 3.

Referring back to FIG. 2, in step 210, the irrigation planning system can obtain irrigation data. In some embodiments, irrigation data can include one or more types of irrigation data, such as irrigation data 370 described with respect to FIG. 3. In some embodiments, the irrigation data can include a soil moisture (SM) and a soil temperature (ST). In some embodiments, the irrigation data can further include time-dependent meteorological parameters, such as precipitation rate ($PR^t$), atmospheric temperature ($T^t$), atmospheric pressure ($P^t$), relative humidity ($RH^t$), wind field ($W^t$), and solar radiation ($SR^t$) (where superscript t represents a time value). In some embodiments, the irrigation planning system can obtain irrigation data intermittently, such that the irrigation planning system can account for changed conditions, such as changed meteorological parameters. In some embodiments, the irrigation data can include a time-dependent watering rate ($WR^t$). In some embodiments the watering rate can be a volumetric flow rate for delivering irrigation water to vegetation during a time interval (t) (e.g., 40 m³/hour, during a first hour).

In some embodiments, in step 210, the irrigation planning system can obtain a set of watering rates (e.g., $WR^t=[WR^0, WR^1, \ldots WR^N]$, where superscript t represents a time value, such as an Nth hour or an Nth day). For example, in some embodiments, the irrigation planning system can obtain an initial set of watering rates from a storage location, such as a computing device, that stores a set of watering rates from a previously generated irrigation plan. In some embodiments, the irrigation planning system can obtain an initial set of watering rates from a user via a computing device, such as computing device 110.

In step 215, the irrigation planning system can obtain a set of custom constraints. In some embodiments, the irrigation planning system can obtain a set of custom constraints from a remote server, such as server 120 of FIG. 1, or from a computing device of a user, such as computing device 110 of FIG. 1. In some embodiments, a set of custom constraints can include a threshold such as a minimum required soil moisture at a root zone depth layer for a specific crop. In some embodiments, the irrigation planning system can calculate such a minimum required soil moisture according to the equation: $B^*=FC^*(1-cc)+cc^*WP$, where $B^*$ is a minimum required soil moisture at a root zone depth layer for a specific crop; FC is a field capacity of soil; cc is a crop coefficient for the specific crop; and WP is the wilting point for the specific crop. In some embodiments, the irrigation planning system can obtain a minimum required soil moisture at a root zone depth layer by calculating $B^*$ based on values for FC, cc, and WP that the irrigation planning system obtains from a remote server or from a computing device of a user. In some embodiments, the irrigation planning system can obtain a minimum required soil moisture at a root zone depth layer from an external source, such as a remote server.

In some embodiments, a set of custom constraints can include a user-specific limitation that is based at least in part on an available time and/or available resources. For example, in some embodiments, a set of custom constraints can include an irrigation time period, such as a time period of five hours, during which irrigation can take place. In some embodiments, a set of custom constraints can include a volumetric flow rate, such as a maximum volumetric flow rate for delivering irrigation water based on available irrigation equipment. By obtaining a set of custom constraints, the irrigation planning system can tailor an irrigation plan to account for one or more user-specific limitations; thus, in some embodiments, the irrigation planning system can address specific irrigation needs with improved accuracy.

In step 220, the irrigation planning system can generate one or more sets of soil moisture estimates based at least in part on obtained irrigation data (e.g., irrigation data obtained in step 210). For example, in some embodiments, the irrigation planning system can generate a set of soil moisture estimates based at least in part on a set of watering rates; thus, the set of soil moisture estimates can correspond to the set of watering rates. In some embodiments, each soil moisture estimate of a set of soil moisture estimates can include an approximation of water content that is present in a unit quantity of soil at a depth layer (e.g., a region of soil below a surface). For example, in some embodiments, a soil moisture estimate of 10% can indicate that water makes up 10% of the mass of one cubic meter of soil at a depth layer. By generating one or more sets of soil moisture estimates based at least in part on obtained irrigation data, the irrigation planning system can account for interactions between a surface, vegetation, and the atmosphere. For example, in some embodiments, the irrigation planning system can estimate an amount of irrigation water that can reach a depth of soil in view of evapotranspiration (e.g., the transfer of water to the atmosphere by evaporation from soil and/or by transpiration from vegetation) that can occur in view of the soil, vegetation, and meteorological parameters involved.

In some embodiments, in step 220, the irrigation planning system can generate a set of soil moisture estimates at a root zone depth layer, based at least in part on a set of watering rates. In some embodiments, a root zone depth layer can be a region below a surface where vegetation can absorb water from soil. In some embodiments, a root zone depth layer can correspond to a particular type of vegetation. For example, in some embodiments, a first crop, such as corn, can have a root zone depth layer extending from 0.1 m below a surface to 0.8 m below the surface. In another example, in some embodiments, a second crop, such as wheat, can have a root zone depth layer extending from 0.1 m below a surface to 0.5 m below the surface.

In some embodiments, in step 220, the irrigation planning system can generate a set of soil moisture estimates at a surplus zone depth layer, based at least in part on a set of watering rates. In some embodiments, a surplus zone depth layer can be a depth layer below a root zone depth layer where the presence of moisture from percolated irrigation water indicates wasted irrigation water. Continuing with the example of the root zone depth layer for the corn crop discussed above, a corresponding surplus zone depth layer can extend beyond 0.8 m below the surface (e.g., from 0.8 m below the surface to 1.5 m below the surface).

In some embodiments, in step 220, the irrigation planning system can generate a set of soil moisture estimates (e.g., $SM^t=[SM^0, SM^1, \ldots SM^N]$, where superscript t represents a time value, such as an Nth hour or an Nth day) that are based at least in part on a set of initial watering rates or a set of adjusted watering rates (discussed in further detail below). In some embodiments, step 220 can include the irrigation planning system obtaining a soil temperature according to a depth and/or a time. In some embodiments, step 220 can include the irrigation planning system calculating an evapotranspiration at a particular time. In some embodiments, step 220 can include the irrigation planning system generating one or more sets of updated soil moisture estimates in response to obtaining one or more sets of adjusted watering rates (see step 240 discussion below). In some embodiments, step 220 can include the irrigation planning system generating one or more updated soil moisture estimates in response to obtaining changed irrigation data, such as changed meteorological parameters.

In step 225, the irrigation planning system can determine whether one or more custom constraints are satisfied and proceed based on whether the one or more custom constraints is satisfied. For example, in some embodiments, the irrigation planning system can compare one or more soil moisture estimates at a root zone depth layer to a minimum required soil moisture at a root zone depth layer ($B^*$) to ensure the one or more soil moisture estimates exceeds a minimum required soil moisture. In some embodiments, if the one or more soil moisture estimates does not exceed the minimum required soil moisture, then the irrigation planning system can proceed to step 240 (discussed further below). In some embodiments, if the one or more soil moisture estimates exceeds the minimum required soil moisture, then the custom constraint can be satisfied, and the irrigation planning system can proceed to step 230.

In some embodiments, a set of custom constraints can include a maximum watering rate, such as a maximum watering rate of a user's irrigation equipment. In these embodiments, the irrigation planning system can compare a set of watering rates to the maximum watering rate to determine whether the maximum watering rate is exceeded. In some embodiments, if one or more of watering rates of the set of watering rates exceeds the maximum watering rate, then the irrigation planning system can adjust the set of watering rates in step 240 (discussed further below). In some embodiments, if no watering rate of the set of watering rates exceeds the maximum watering rate, then the custom constraint can be satisfied, and the irrigation planning system can proceed to step 230.

In some embodiments, a set of custom constraints can include an irrigation time period during which irrigation can take place. For example, in some embodiments, a user can input into the irrigation planning system a maximum irrigation time period. In these embodiments, the irrigation planning system can compare an irrigation time period of a set of watering rates to the maximum irrigation time period to determine whether the irrigation time period of the set of watering rates exceeds the maximum irrigation time period. For example, a set of watering rates can have an irrigation time period of 3 hours (e.g., $WR^t = [WR^0, WR^1, WR^2]$, where $WR^0$ indicates a watering rate from 0-1 hours; $WR^1$ indicates a watering rate from 1-2 hours; and $WR^2$ indicates a watering rate from 2-3 hours). In this example, if a set of custom constraints includes a maximum irrigation time period of 3 or more hours, then the irrigation planning system can proceed to step 230, as the custom constraint would be satisfied. However, in this example, if a set of custom constraints includes a maximum irrigation time period of less than three hours, then the irrigation planning system can proceed to step 240 to adjust the set of watering rates (discussed further below).

In step 230, the irrigation planning system can obtain a moisture reference value. In some embodiments, the moisture reference value can include a soil moisture estimate according to a depth and/or a time. In some embodiments, the moisture reference value can indicate a change in soil moisture at a depth over a period of time. In some embodiments, the moisture reference value can be based on a set of soil moisture estimates; thus, the moisture reference value can correspond to the set of soil moisture estimates.

For example, in some embodiments, the moisture reference value can include a total water consumption loss ($f(WR^t)$). In some embodiments, the irrigation planning system can calculate the total water consumption loss based on a set of soil moisture estimates according to the formula:

$$f(WR^t) = \sum_{t=0}^{N-1} |SM_{d'}^{t+1} - SM_{d'}^t| * \Delta t, \quad (1)$$

where:

$SM_{d'}^t$, is a soil moisture estimate for a time (t) at a surplus zone depth layer (d');

$SM_d^{t+1}$, is a soil moisture estimate for a subsequent time (t+1) at the surplus zone depth layer (d'); N represents an Nth time; and $\Delta t$ is a time difference. In this example, a total water consumption loss can indicate a percolation of water into the surplus zone depth layer. As described in further detail below, the irrigation planning system can generate a minimum total water consumption loss, which can correspond to a minimum percolation of water into the surplus zone depth layer. In some embodiments, a moisture reference value can include a difference between two total water consumption losses.

In step 235, the irrigation planning system can determine whether one or more thresholds are exceeded. For example, in some embodiments, the irrigation planning system can determine whether a total water consumption loss exceeds a predetermined threshold. In some embodiments, the irrigation planning system can determine whether a difference between a first total water consumption loss and a second total water consumption loss exceeds a predetermined threshold. In some embodiments, the predetermined threshold can be selected by a user. In some embodiments, the predetermined threshold can be selected by the irrigation planning system based on its analysis of previously generated irrigation plans and/or machine learning techniques. In some embodiments, if the one or more thresholds are not exceeded, the irrigation planning system can proceed to step 240. In some embodiments, if the one or more thresholds are exceeded, the irrigation planning system can proceed to step 245.

In some embodiments, the predetermined threshold in step 235 can apply to one or more total water consumption losses calculated by the irrigation planning system. In an example in which the predetermined threshold can apply to one total water consumption loss calculated by the irrigation planning system, an initial set of watering rates can be obtained by the irrigation planning system in step 210. Continuing with this example, in step 220, the irrigation planning system can generate a first set of soil moisture estimates at a surplus zone depth layer based at least in part on the initial set of watering rates; thus, the first set of soil moisture estimates can correspond to the initial set of watering rates. Continuing with this example, in step 230, the irrigation planning system can calculate a first total water consumption loss based on the first set of soil moisture estimates; thus, the first total water consumption loss can correspond to the first set of soil moisture estimates and to the initial set of watering rates. Continuing with this example, a user can input into the irrigation planning system a maximum threshold value for the first total water consumption loss. Continuing with this example, in step 235, the irrigation planning system can compare the first total water consumption loss to the maximum threshold value and proceed to step 240 if the first total water consumption loss is greater than the maximum threshold value. Continuing with this example, the irrigation planning system can proceed to step 245 if the first total water consumption loss is less than the maximum threshold value.

In some embodiments, the predetermined threshold in step 235 can apply to more than one total water consumption loss. For example, in some embodiments, the irrigation planning system can generate a first total water consumption loss and a second total water consumption loss. In this example, the irrigation planning system can compare the difference between the first total water consumption loss and the second total water consumption loss to a predetermined threshold. For example, in some embodiments, the predetermined threshold can be 0.00005, and the predetermined threshold can be exceeded when the difference between the first total water consumption loss and the second total water consumption loss is less than 0.00005. In some embodiments, the irrigation planning system can compare a predetermined threshold to a percentage change between a first total water consumption loss and a second total water consumption loss. In some embodiments, the predetermined threshold can be selected such that the predetermined threshold is exceeded when the first total water consumption loss and the second total water consumption loss are approximately equal (e.g., have an absolute difference that can be less than approximately 0.01; have a percentage change that can be less than approximately 0.01%; etc.).

In some embodiments, in step 235, a determination by the irrigation planning system that the threshold is exceeded can indicate at least one of the following: an optimal criterion has been reached; percolated water into a surplus zone depth layer is minimized; and water-related losses are minimized.

In step 240, the irrigation planning system can obtain a set of watering rates and generate an adjusted set of watering rates. In some embodiments, the obtained set of watering rates can be a set of watering rates that corresponds to custom constraints not being satisfied in step 225. In some embodiments, the irrigation planning system can continue an iterative process of generating adjusted sets of watering rates in step 240 until a set of custom constraints is satisfied in step 225 (e.g., the irrigation planning system can repeat steps 220, 225, and 240 until a set of custom constraints is satisfied). In some embodiments, the obtained set of watering rates can be a set of watering rates that corresponds to a threshold not being exceeded in step 235. In some embodiments, the irrigation planning system can continue an iterative process of generating adjusted sets of watering rates in step 240 until a threshold is exceeded in step 235 (e.g., the irrigation planning system can repeat steps 220 through 240 until a threshold is exceeded).

In some embodiments, in step 240, an adjustment to a set of watering rates between consecutive iterations can be performed by a plan optimizer (e.g., plan optimizer 350, discussed further below) in conjunction with a soil moisture simulator (e.g., soil moisture simulator 340, discussed further below). For example, in some embodiments, the soil moisture simulator can automatically output a normalized adjustment of watering rates to be applied to a set of watering rates of a first iteration. In this example, the plan optimizer can find the correct scale to be multiplied to the normalized adjustment by scanning a range of scales within a minimum and a maximum value such that adding the multiplied adjustment to the set of watering rates of the first iteration can maximally reduce a total water consumption loss. In some embodiments, an adjustment to a set of watering rates between consecutive iterations can be performed by a plan optimizer without a normalized adjustment of watering rates from a soil moisture simulator. For example, in some embodiments, the plan optimizer can design candidate adjustment rates via a methodical increment/decrement process applied to each watering rate of a set of watering rates. The plan optimizer can then add each candidate adjustment rate to the set of watering rates of the first iteration to generate an adjusted set of watering rates.

In some embodiments, the irrigation planning system can generate an adjusted set of watering rates by manipulating (e.g., adding/removing, increasing/decreasing, etc.) one or more watering rates of an obtained set of watering rates. For example, if a set of custom constraints requires a 3-hour irrigation time period and an obtained set of watering rates includes a 5-hour irrigation time period, then, in step 240, the irrigation planning system can reduce the irrigation time period of the obtained set of watering rates from five hours to three hours, resulting in an adjusted set of watering rates. In some embodiments, the irrigation planning system can generate an adjusted set of watering rates by manipulating an irrigation time increment of one or more watering rates. For example, a set of watering rates having three, 1-hour watering rates has an irrigation time period of three hours and an irrigation time increment of one hour. In this example, the set of watering rates can be manipulated, in step 240, such that a resulting adjusted set of watering rates can have two, 1-hour watering rates and two, 0.5-hour watering rates. In this example, the adjusted set of watering rates has an irrigation time period of three hours, a first irrigation time increment of one hour, and a second irrigation time increment of one-half hour. In some embodiments, the irrigation planning system can determine how to manipulate an obtained set of watering rates according to its analysis of previously generated irrigation plans and/or machine learning techniques.

If the irrigation planning system determines in step 235 that the threshold is exceeded, then in step 245, the irrigation planning system can output an irrigation plan. In some embodiments, step 245 can include transmitting an irrigation plan to a controller of an irrigation device, such as the irrigation device 160 discussed with respect to FIG. 1. In some embodiments, the irrigation plan can include a final adjusted set of watering rates generated in step 240. For example, in some embodiments, the irrigation planning system can continue an iterative process five times before it determines that a threshold is exceeded in step 235. In this example, the fifth adjusted set of watering rates generated in step 240 can be the final adjusted set of watering rates. In some embodiments, the irrigation plan can include an initial set of watering rates that satisfies custom constraints in step 225 and exceeds a threshold in step 235. In some embodiments, an irrigation plan can include one or more of a set of watering rates, an irrigation time period, one or more irrigation time increments, an irrigation date, and an irrigation time of day. In some embodiments, the set of watering rates included in an irrigation plan can minimize water-related losses during irrigation.

Figure 3:
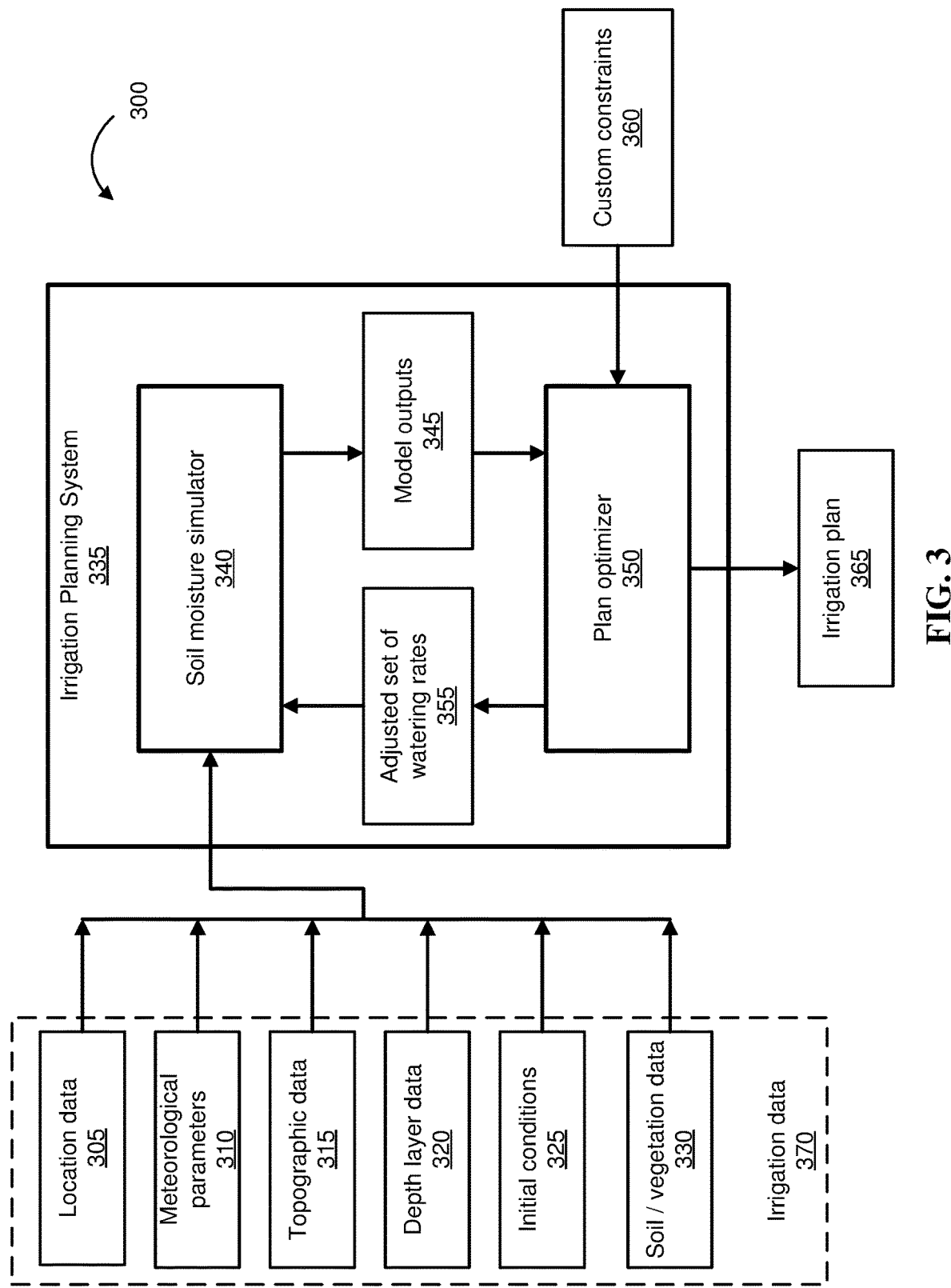
FIG. 3 depicts an example system block diagram of an irrigation planning system, in accordance with embodiments of the present disclosure.

FIG. 3 illustrates an example system block diagram 300 of an irrigation planning system 335, in accordance with embodiments of the present disclosure. The irrigation planning system 335 can include one or more processors and/or neural networks. In some embodiments, the irrigation planning system 335 can include a computer system, such as the computer system 401 described with respect to FIG. 4. Referring back to FIG. 3, in some embodiments, the irrigation planning system 335 can obtain one or more types of irrigation data 370. In some embodiments, irrigation data can include location data 305, meteorological parameters 310, topographic data 315, depth layer data 320, initial conditions 325, and soil/vegetation data 330. In some embodiments, the irrigation data 370 can be obtained from one or more sources such as a data entry device of a user, a set of sensors, and one or more local or remote computer systems.

In some embodiments, location data 305 can include geographic location information, such as global positioning system coordinates. In some embodiments, meteorological parameters 310 can include time-dependent meteorological parameters, such as precipitation rate, temperature, relative humidity, solar radiation, atmospheric pressure, and wind speed and direction. In some embodiments, meteorological parameters can include anticipated meteorological parameters from a weather forecast. In some embodiments, topographic data 315 can include information about elevation and the slope of terrain. In some embodiments, depth layer data 320 can include depth layer definitions, such as the depths that define upper and lower boundaries of a root zone depth layer for a particular crop. In some embodiments, the depth layer data 320 can include a depth that defines a surplus zone depth layer. In some embodiments, initial conditions 325 can include an initial irrigation data estimate input by a user, such as a user's guess for an initial set of watering rates. In some embodiments, initial conditions 325 can include irrigation data or an irrigation plan that was previously obtained by the irrigation planning system 335. In some embodiments, soil/vegetation data 330 can include information such as soil and vegetation types and properties. In some embodiments, soil/vegetation data 330 can include at least one of a minimum required soil moisture at a root zone depth layer for a specific crop (B*); a field capacity of soil (FC); a crop coefficient for a specific crop (cc); and a wilting point for a specific crop (WP). In some embodiments, soil/vegetation data 330 can include information such as optimal (e.g., preferred or beneficial) irrigation conditions for vegetation (e.g., a particular time and/or date, and set of watering rates that can correspond to a profitable crop yield).

In some embodiments, the irrigation planning system 335 can include a soil moisture simulator 340. In some embodiments, the soil moisture simulator 340 can perform at least one of steps 210, 215, and 220 discussed with respect to FIG. 2. In some embodiments, the soil moisture simulator 340 can be a submodule of the irrigation planning system 335. In some embodiments, the soil moisture simulator 340 can obtain one or more types of irrigation data 370 and generate one or more model outputs 345 based on the one or more types of irrigation data 370. In some embodiments, model outputs 345 can include at least one set of a soil moisture estimates according to a time and a depth; a soil temperature estimate according to a time and a depth; and an evapotranspiration value according to a time. In some embodiments, the soil moisture simulator can transmit the one or more model outputs 345 to a plan optimizer 350.

In some embodiments, the plan optimizer 350 can perform one or more of steps 215, 225, 230, 235, 240, and 245 discussed with respect to FIG. 2. In some embodiments, the plan optimizer 350 can obtain one or more model outputs 345 from the soil moisture simulator 340. In some embodiments, the plan optimizer 350 can obtain a set of custom constraints 360 from a source (e.g., a user input device, a data storage location, etc.). In some embodiments, a set of custom constraints 360 can include limitations such as a time period for irrigation, a threshold quantity of water for irrigation, a specific time and/or date for irrigation, a specific soil moisture according to a time and a depth, and a threshold flow rate for providing irrigation water. In some embodiments, a set of custom constraints 360 can include at least one of a minimum required soil moisture at a root zone depth layer for a specific crop (B*); a field capacity of soil (FC); a crop coefficient for a specific crop (cc); and a wilting point for a specific crop (WP). In some embodiments, a set of custom constraints 360 can include a threshold, such as the one or more thresholds discussed with respect to step 235 in FIG. 2.

In some embodiments, the plan optimizer 350 can generate an adjusted set of watering rates 355 based at least in part on the model outputs 345 and/or the custom constraints 360. In some embodiments, the plan optimizer 350 can transmit the adjusted set of watering rates 355 to the soil moisture simulator 340. In some embodiments, the irrigation planning system 335 can implement an iterative process between the soil moisture simulator 340 and the plan optimizer 350 to generate an irrigation plan 365. In these embodiments, the soil moisture simulator 340 can cyclically transmit model outputs 345 to the plan optimizer 350 and the plan optimizer 350 can cyclically transmit adjusted sets of watering rates 355 to the soil moisture simulator 340 until the set of model outputs 345 satisfies custom constraints 360.

In some embodiments, the irrigation plan 365 generated by the irrigation planning system 335 can provide a unique set of watering rates that accurately accounts for ambient conditions and custom constraints, while simultaneously minimizing water-related losses. Accordingly, in some embodiments, the irrigation planning system 335 can provide an irrigation plan 365 that is specifically tailored to a user's irrigation requirements. In some embodiments, the irrigation plan 365 generated by the irrigation planning system 335 can be output to an irrigation device, such as the irrigation device 160 discussed with respect to FIG. 1.

Figure 4:
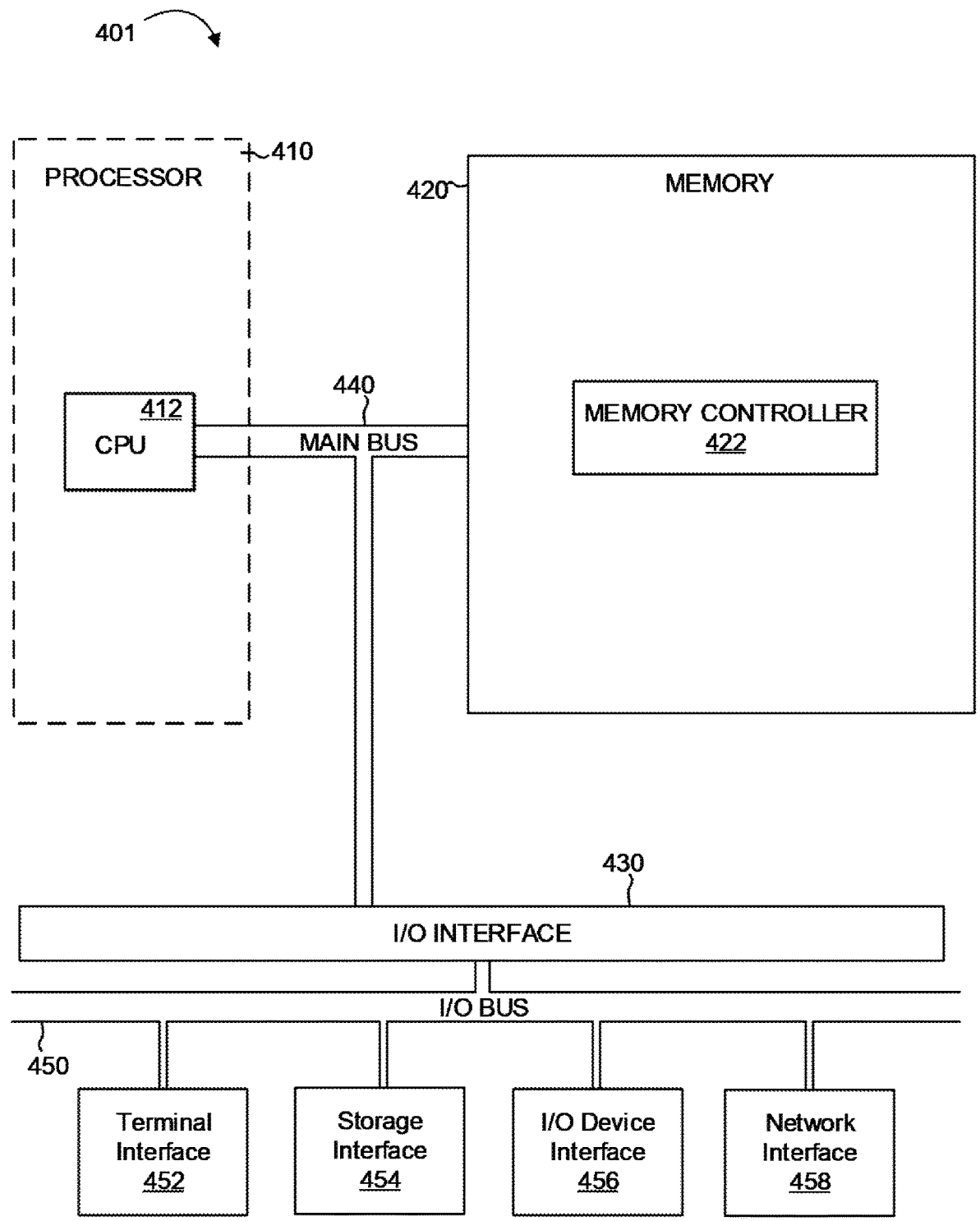
FIG. 4 depicts the representative major components of a computer system that can be used in accordance with embodiments of the present disclosure.

FIG. 4 depicts the representative major components of an exemplary Computer System 401 that can be used in accordance with embodiments of the present disclosure. The particular components depicted are presented for the purpose of example only and are not necessarily the only such variations. The Computer System 401 can comprise a Processor 410, Memory 420, an Input/Output Interface (also referred to herein as I/O or I/O Interface) 430, and a Main Bus 440. The Main Bus 440 can provide communication pathways for the other components of the Computer System 401. In some embodiments, the Main Bus 440 can connect to other components such as a specialized digital signal processor (not depicted).

The Processor 410 of the Computer System 401 can be comprised of one or more CPUs 412. The Processor 410 can additionally be comprised of one or more memory buffers or caches (not depicted) that provide temporary storage of instructions and data for the CPU 412. The CPU 412 can perform instructions on input provided from the caches or from the Memory 420 and output the result to caches or the Memory 420. The CPU 412 can be comprised of one or more circuits configured to perform one or methods consistent with embodiments of the present disclosure. In some embodiments, the Computer System 401 can contain multiple Processors 410 typical of a relatively large system. In other embodiments, however, the Computer System 401 can be a single processor with a singular CPU 412.

The Memory 420 of the Computer System 401 can be comprised of a Memory Controller 422 and one or more memory modules for temporarily or permanently storing data (not depicted). In some embodiments, the Memory 420 can comprise a random-access semiconductor memory, storage device, or storage medium (either volatile or nonvolatile) for storing data and programs. The Memory Controller 422 can communicate with the Processor 410, facilitating storage and retrieval of information in the memory modules. The Memory Controller 422 can communicate with the I/O Interface 430, facilitating storage and retrieval of input or output in the memory modules. In some embodiments, the memory modules can be dual in-line memory modules.

The I/O Interface 430 can comprise an I/O Bus 450, a Terminal Interface 452, a Storage Interface 454, an I/O Device Interface 456, and a Network Interface 458. The I/O Interface 430 can connect the Main Bus 440 to the I/O Bus 450. The I/O Interface 430 can direct instructions and data from the Processor 410 and Memory 420 to the various interfaces of the I/O Bus 450. The I/O Interface 430 can also direct instructions and data from the various interfaces of the I/O Bus 450 to the Processor 410 and Memory 420. The various interfaces can comprise the Terminal Interface 452, the Storage Interface 454, the I/O Device Interface 456, and the Network Interface 458. In some embodiments, the various interfaces can comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—can communicate failures and changes to one or more components to a hypervisor or operating system (not depicted). The hypervisor or the operating system can allocate the various resources available in the Computer System 401 and track the location of data in Memory 420 and of processes assigned to various CPUs 412. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
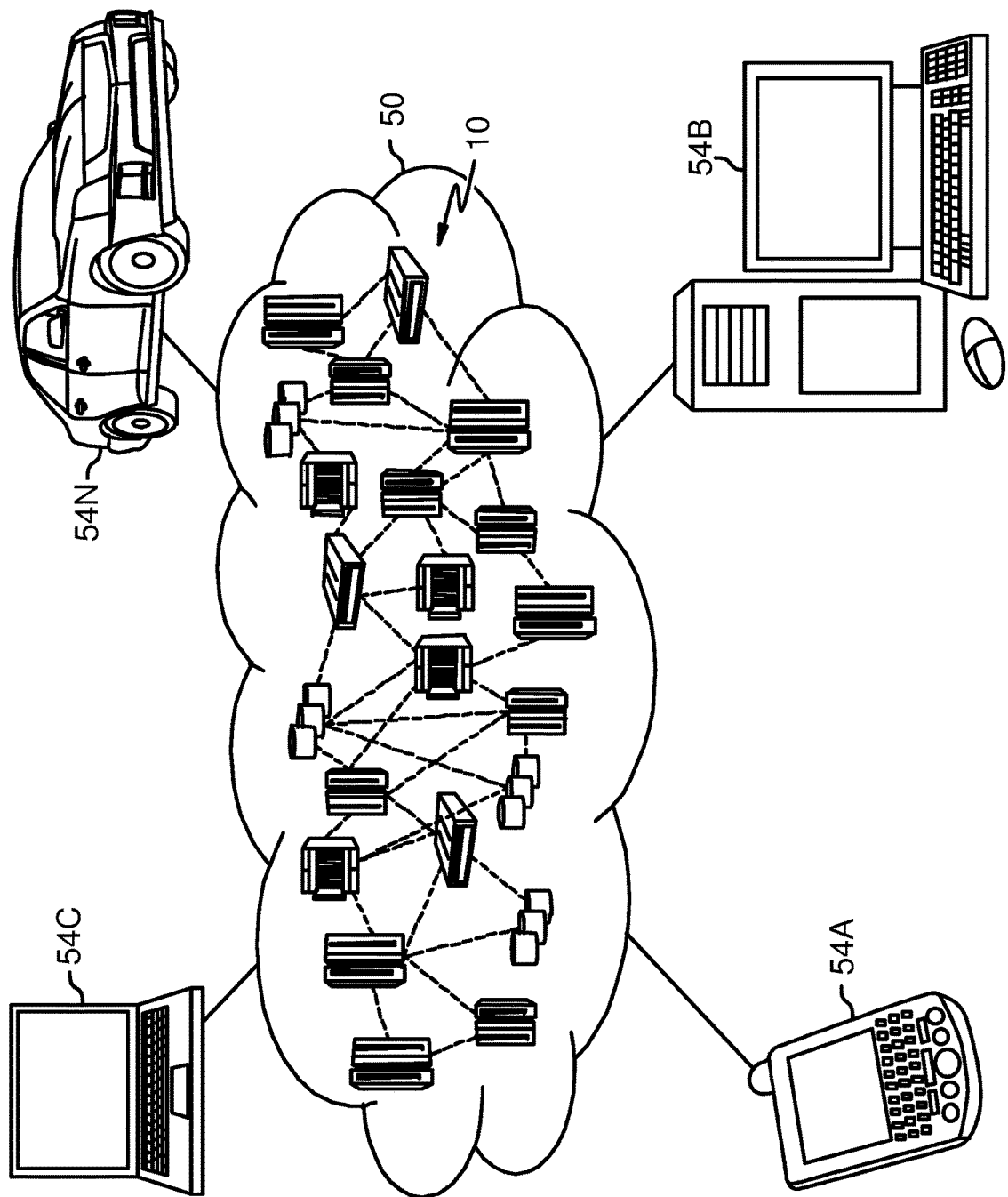
FIG. 5 depicts a cloud computing environment according to embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
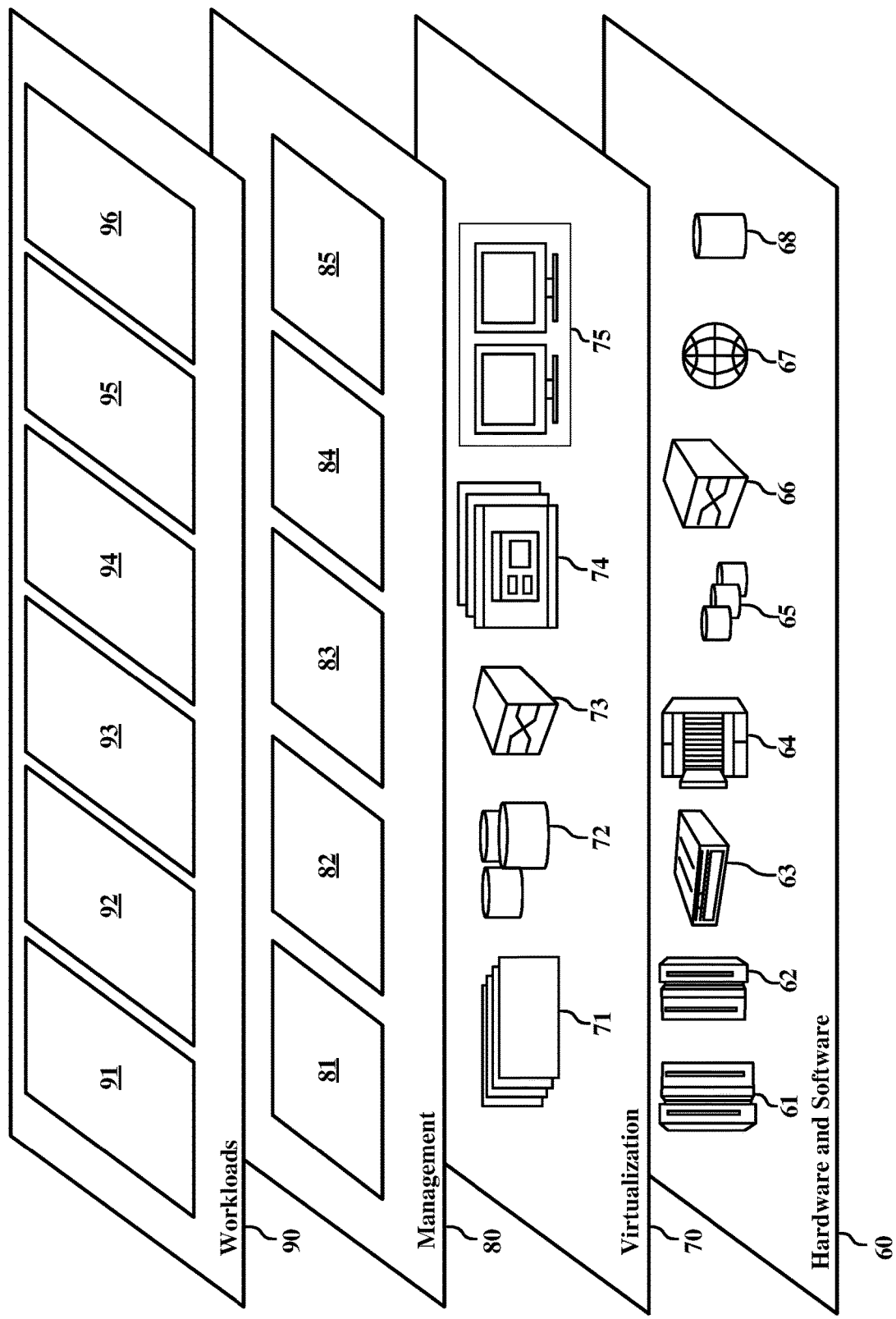
FIG. 6 depicts abstraction model layers according to embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and irrigation planning logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining, by an irrigation planning system, irrigation data;
   obtaining, by the irrigation planning system, a first set of watering rates;
   generating, by the irrigation planning system, a first set of soil moisture estimates and a second set of soil moisture estimates,
      wherein the first set of soil moisture estimates and the second set of soil moisture estimates are based at least in part on the irrigation data, the second set of soil moisture estimates including a soil moisture estimate at a surplus zone depth layer;
   obtaining, by the irrigation planning system, a custom constraint;
   making a first determination, by the irrigation planning system, that the first set of soil moisture estimates satisfies the custom constraint;
   obtaining, by the irrigation planning system, a moisture reference value in response to making the first determination,
      wherein the moisture reference value is based at least in part on the second set of soil moisture estimates, the moisture reference value obtained by calculating a difference between a first soil moisture estimate at the surplus zone depth layer at a first time and a second soil moisture estimate at the surplus zone depth layer at a second time;
   making a second determination, by the irrigation planning system, that the moisture reference value exceeds a first threshold; and
   generating, by the irrigation planning system, an irrigation plan in response to making the second determination.

2. The computer-implemented method of claim 1, wherein the first set of soil moisture estimates includes a soil moisture estimate at a root zone depth layer.

3. The computer-implemented method of claim 2, wherein the custom constraint is a minimum required soil moisture at the root zone depth layer.

4. The computer-implemented method of claim 1, further comprising obtaining a second custom constraint,
   wherein the first set of watering rates satisfies the second custom constraint.

5. The computer-implemented method of claim 1, wherein generating the first set of watering rates comprises generating an adjusted set of watering rates.

6. An irrigation planning system comprising:
   a processor; and
   a memory in communication with the processor, the memory containing program instructions that, when executed by the processor, are configured to cause the processor to perform a method, the method comprising:
   obtaining, by the irrigation planning system, irrigation data;
   obtaining, by the irrigation planning system, a first set of watering rates;

generating, by the irrigation planning system, a first set of soil moisture estimates and a second set of soil moisture estimates,
    wherein the first set of soil moisture estimates and the second set of soil moisture estimates are based at least in part on the irrigation data, the second set of soil moisture estimates including a soil moisture estimate at a surplus zone depth layer;
obtaining, by the irrigation planning system, a custom constraint;
making a first determination, by the irrigation planning system, that the first set of soil moisture estimates satisfies the custom constraint;
obtaining, by the irrigation planning system, a moisture reference value in response to making the first determination,
    wherein the moisture reference value is based at least in part on the second set of soil moisture estimates, the moisture reference value obtained by calculating a difference between a first soil moisture estimate at the surplus zone depth layer at a first time and a second soil moisture estimate at the surplus zone depth layer at a second time;
making a second determination, by the irrigation planning system, that the moisture reference value exceeds a first threshold; and
generating, by the irrigation planning system, an irrigation plan in response to making the second determination.

7. The irrigation planning system of claim 6, wherein the first set of soil moisture estimates includes a soil moisture estimate at a root zone depth layer.

8. The irrigation planning system of claim 7, wherein the custom constraint is a minimum required soil moisture at the root zone depth layer.

9. The irrigation planning system of claim 6, further comprising obtaining a second custom constraint,
    wherein the first set of watering rates satisfies the second custom constraint.

10. The irrigation planning system of claim 6, wherein generating the first set of watering rates comprises generating an adjusted set of watering rates.

11. A computer program product, the computer program product comprising a computer readable storage medium having program instructions embodied therewith, the program instructions executable by a computer to cause the computer to:
    obtain, by an irrigation planning system, irrigation data;
    obtain, by the irrigation planning system, a first set of watering rates;
    generate, by the irrigation planning system, a first set of soil moisture estimates and a second set of soil moisture estimates,
        wherein the first set of soil moisture estimates and the second set of soil moisture estimates are based at least in part on the irrigation data, the second set of soil moisture estimates including a soil moisture estimate at a surplus zone depth layer;
    obtain, by the irrigation planning system, a custom constraint;
    make a first determination, by the irrigation planning system, that the first set of soil moisture estimates satisfies the custom constraint;
    obtain, by the irrigation planning system, a moisture reference value in response to making the first determination,
        wherein the moisture reference value is based at least in part on the second set of soil moisture estimates, the moisture reference value obtained by calculating a difference between a first soil moisture estimate at the surplus zone depth layer at a first time and a second soil moisture estimate at the surplus zone depth layer at a second time;
    make a second determination, by the irrigation planning system, that the moisture reference value exceeds a first threshold; and
    generate, by the irrigation planning system, an irrigation plan in response to making the second determination.

12. The computer program product of claim 11, wherein the first set of soil moisture estimates includes a soil moisture estimate at a root zone depth layer.

13. The computer program product of claim 12, wherein the custom constraint is a minimum required soil moisture at the root zone depth layer.

14. The computer program product of claim 11, wherein the program instructions further cause the computer to obtain a second custom constraint, wherein the first set of watering rates satisfies the second custom constraint.

* * * * *